US010565740B2

(12) United States Patent
Beymore et al.

(10) Patent No.: US 10,565,740 B2
(45) Date of Patent: *Feb. 18, 2020

(54) PIGMENT IDENTIFICATION OF COMPLEX COATING MIXTURES WITH SPARKLE COLOR

(71) Applicant: PPG Industries Ohio, Inc., Cleveland, OH (US)

(72) Inventors: Paul M. Beymore, Vermilion, OH (US); A'Lisa Marie Krawciw, North Olmsted, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,593

(22) Filed: Jan. 19, 2018

(65) Prior Publication Data

US 2018/0144505 A1   May 24, 2018

Related U.S. Application Data

(63) Continuation of application No. 15/470,483, filed on Mar. 27, 2017, now Pat. No. 9,905,027, which is a
(Continued)

(51) Int. Cl.
*G06T 7/90* (2017.01)
*G01J 3/50* (2006.01)
*G01J 3/46* (2006.01)

(52) U.S. Cl.
CPC ............... *G06T 7/90* (2017.01); *G01J 3/463* (2013.01); *G01J 3/50* (2013.01); *G01J 3/504* (2013.01)

(58) Field of Classification Search
CPC ... G06T 7/90; G01J 3/504; G01J 3/463; G01J 3/50
See application file for complete search history.

(56) References Cited

U.S. PATENT DOCUMENTS

| 4,479,718 A | 10/1984 | Alman |
| 5,583,642 A | 12/1996 | Nakazono |

(Continued)

FOREIGN PATENT DOCUMENTS

| CN | 1419672 | 5/2003 |
| CN | 1635957 A | 7/2005 |

(Continued)

OTHER PUBLICATIONS

Anonymous, "Detection of Outliers", NIST/SEMATECH e-Handbook of Statistical Methods, Chapter 1.3.5.17, 2012, XP055162021, 5 pp.

(Continued)

*Primary Examiner* — Yon J Couso
(74) *Attorney, Agent, or Firm* — Michael J. Frodsham (57) ABSTRACT

Using an image capturing device, multiple images can be obtained at different angles with respect to a surface of a target coating. In one computer-implemented embodiment, a method involves using a filtering technique to perform an image analysis on the obtained images to determine the presence of sparkle points within the images. A color attribute analysis can then be performed to determine various color attributes associated with the determined sparkle point. A sparkle color distribution can then be calculated in response to the color attribute analysis. A coating formulation can then be generated, in association with the calculated sparkle color distribution, which is the same or substantially similar to the target coating.

29 Claims, 5 Drawing Sheets
(1 of 5 Drawing Sheet(s) Filed in Color)

Related U.S. Application Data continuation of application No. 14/121,869, filed on Oct. 28, 2014, now Pat. No. 9,607,403.

(56) References Cited

U.S. PATENT DOCUMENTS

| | | | |
|---|---|---|---|
| 6,249,751 | B1 | 6/2001 | Asaba et al. |
| 6,507,803 | B1 | 1/2003 | Eickmeyer |
| 6,539,325 | B1 | 3/2003 | Numata et al. |
| 6,794,669 | B2 | 9/2004 | Chelvayohan et al. |
| 7,014,466 | B2 | 3/2006 | Cojic et al. |
| 7,860,856 | B2 | 12/2010 | Lewis |
| 7,944,561 | B2 | 5/2011 | Nisper et al. |
| 8,065,314 | B2 * | 11/2011 | Prakash .............. G01J 3/46 345/589 |
| 8,345,252 | B2 | 1/2013 | Nisper et al. |
| 9,996,765 | B2 | 6/2018 | Yajko |
| 2006/0104508 | A1 | 5/2006 | Daly et al. |
| 2006/0181707 | A1 * | 8/2006 | Gibson ............... B01F 13/1055 356/402 |
| 2008/0235224 | A1 | 9/2008 | Rodrigues et al. |
| 2009/0019086 | A1 | 1/2009 | Prakash |
| 2009/0157212 | A1 | 6/2009 | McClanahan |
| 2014/0242274 | A1 | 8/2014 | Vallery |
| 2015/0023054 | A1 | 1/2015 | Goda et al. |
| 2015/0276485 | A1 | 10/2015 | Alman |

FOREIGN PATENT DOCUMENTS

| | | |
|---|---|---|
| CN | 1666094 | 9/2005 |
| CN | 101535787 A | 9/2009 |
| CN | 101896800 | 11/2010 |
| CN | 104114985 | 10/2014 |
| JP | H08145797 A | 6/1996 |
| JP | 2001221690 A | 8/2001 |
| JP | 2003294530 | 10/2003 |
| JP | 2010242018 | 10/2010 |
| JP | 2002259398 | 2/2011 |
| JP | 2011506961 | 3/2011 |
| JP | 2013047678 | 3/2013 |
| JP | 2011522255 | 8/2014 |
| KR | 20100102147 | 9/2010 |
| TW | 201339652 A | 10/2013 |
| WO | 03063719 A1 | 8/2003 |
| WO | 2013049792 A1 | 4/2013 |
| WO | 2014134099 | 9/2014 |

OTHER PUBLICATIONS

Paravina et al., "Evaluation of Blending Effect of Composites Related to Restoration Size", Dental Materials, Elsevier, Amsterdam, IL, XP027943381, ISSN 0109-5641, Table 2, vol. 22, No. 4, 2006, pp. 299-307.

Takagi et al., "Prediction of Spectral Reflectance Factor Distribution of Color-Shift Paint Finishes", Color Research & Application, John Wiley & Sons, Inc., US, vol. 32, No. 5, 2007, XP002604927, ISSN 0361-2317, pp. 378-387.

Notification of Reasons for Refusal for application No. 2017-522644 dated Apr. 6, 2018.

Notification of Reason for Refusal for application No. 10-2017-7014185 dated Apr. 17, 2018.

Mainali, Dipak and Rein, Alan, "Mix Ratio Identification in Industrially Significant Two-Part Coating Systems Using the Agilent 4300 Handheld FTIR", May 6, 2015, Agilent Technologies, Inc., 5991-5886EN, U.S.A.

Eng, Jimmy K., McCormack, Ashley L., Yates, III, John R., "An approach to Correlate Tandem Mass Spectral Dta of Peptides with Amino Acid Sequences in a Protein Database", American Society for Mass Spectrometry, 1994, 5, 976-989, Seattle, Washington.

Gall, Ludwig, "Computer Time-Sharing Aids Color Matching", Paint and Varnish Production, Aug. 1971, pp. 37-44.

Berns, Roy S., "Principles of Color Technology", Billmeyer and Saltzman's, Third Edition, John Wiley & Sons, Inc. Copyright 2000, United States, ISBN 0-471-19459-X, pp. 149-155.

Japanese Search Report for application No. 2017-522644, dated Feb. 23, 2018.

Ohinese Search Report for application No. 2015800664490, dated Feb. 2, 2018.

* cited by examiner

PIGMENT IDENTIFICATION OF COMPLEX COATING MIXTURES WITH SPARKLE COLOR

CROSS-REFERENCE TO RELATED APPLICATION

This application is a continuation of U.S. patent application Ser. No. 15/470,483, filed Mar. 27, 2017, which is a continuation of U.S. patent application Ser. No. 14/121,869, filed Oct. 28, 2014, which issued as U.S. Pat. No. 9,607,403 on Mar. 28, 2017; and all of the foregoing applications are incorporated herein by reference.

FIELD OF THE INVENTION

In various embodiments, the present invention generally relates to a method and apparatus for identifying physical property attributes of cured complex coating (e.g., paint) mixtures.

BACKGROUND OF THE INVENTION

Due to the nature of complex mixtures within coatings, it is sometimes difficult to formulate, identify, and/or search for acceptable matching formulations and/or pigmentations. In an ideal setting, an individual could view a complex coating mixture and determine the appropriate pigments within the coating mixture. However, in reality the pigments in a coating mixture may not be readily available in a set of toners of a paint system that is to be utilized to make a matching coating. Thus, a skilled color matcher has to make a determination as to whether the paint system contains appropriate offsets and, if so, must determine additional changes which need to be made to accommodate the offsets given that they are not identical matches to the original pigmentation.

A hypothetical solution to determining the composition of an unknown pigmentation is to read the unknown with a device that can search a database for the best matching coating formula within the database (or a device that can immediately create a new coating formula). However, such a solution is only hypothetical because systems are able to determine color or bulk effect pigment type, but generally cannot assist in determination of, for example, the specific pearl necessary for a coating formulation match.

Traditional techniques to evaluate the properties of complex coating mixtures include a variety of in-plane viewing conditions (e.g., the J361 Recommended Practice promulgated by SAE International) combined with microscopic evaluation of a sample. Such approaches are generally not appropriately defined to address new effect pigmentations in complex mixtures and are largely focused on textiles and only "obscurely" identified "out-of-plane" viewing angles with at least two light sources so that the effect pigmentations may be viewed properly. Other techniques involve using a spectrophotometer (e.g., in-plane multi-angle devices for effect samples and spherical devices for straight shade samples). However, new pigments are not able to be adequately characterized using such techniques due to the unique properties of Colorstream® pearls, colored aluminums, etc. For example, it may be challenging to view, for example, Colorstream® pigments and it may be nearly impossible to see coarseness of colored aluminums and, thus, a microscope may be required to adequately determine special effect pigments, which is a time consuming process and may not satisfactorily address application issues which modify the characteristics of the sample and the effect of the special pigments.

Other strategies have been developed using painted or virtual samples representing various textures, and then comparing those to unknown samples. Such techniques often require substantial user intervention and are subjective, which produces inconsistent results depending on the skill of the user. Thus, a need exists for systems and methods that are suitable for analyzing complex coating mixtures having sparkle color.

SUMMARY OF THE INVENTION

In a first aspect, embodiments of the invention provide a method that includes obtaining, using a processor, image data from a target coating. The method also includes performing, using the processor, an image analysis to determine at least one sparkle point from the image data, and performing, using the processor, a hue analysis to determine a sparkle color from the sparkle point. The method further includes calculating, using the processor, a sparkle color distribution, and generating, using the processor, a coating formulation that is the same or substantially similar in appearance to the target coating.

In another aspect, embodiments of the invention are directed to a system that includes a database and a processor in communication with the database. The processor is programmed to: obtain image data from a target coating; perform an image analysis to determine at least one sparkle point from the image data; perform a hue analysis to determine a sparkle color from the sparkle point; calculate a sparkle color distribution; and generate a coating formulation that is the same or substantially similar in appearance to the target coating.

In another aspect, embodiments of the invention provide an apparatus. The apparatus includes means for obtaining image data from a target coating and means for performing an image analysis to determine at least one sparkle point from the image data. The apparatus also includes means for performing a hue analysis to determine a sparkle color from the sparkle point and means for calculating a sparkle color distribution. The apparatus further includes means for generating a coating formulation that is the same or substantially similar in appearance to the target coating.

In a further aspect, embodiments of the invention provide a non-transitory computer readable medium including software for causing a processor to: obtain image data from a target coating; perform an image analysis to determine at least one sparkle point from the image data; perform a hue analysis to determine a sparkle color from the sparkle point; calculate a sparkle color distribution; and generate a coating formulation that is the same or substantially similar in appearance to the target coating.

BRIEF DESCRIPTION OF THE DRAWINGS

The patent of application file contains at least one drawing executed in color. Copies of the patent or patent application publication with color drawing(s) will be provided by the Office upon request and payment of the necessary fee.

DETAILED DESCRIPTION OF THE INVENTION

While the description herein generally refers to automotive and automotive refinish paint, it should be understood that the devices, systems and methods apply to other types of coatings, including stain and industrial coatings. The described embodiments of the invention should not be considered as limiting. A method consistent with the present invention may be practiced in a variety of fields such as the matching and/or coordination of apparel and fashion products.

Embodiments of the invention may be used with or incorporated in a computer system that may be a standalone unit or include one or more remote terminals or devices in communication with a central computer via a network such as, for example, the Internet or an intranet. As such, the computer or "processor" and related components described herein may be a portion of a local computer system or a remote computer or an on-line system or combinations thereof. The database and software described herein may be stored in computer internal memory or in a non-transitory computer readable medium.

Embodiments of the invention are directed generally to systems and methods that use an image capturing device, such as a limited multi-angle color camera (optionally in combination with a spectrophotometer) that can produce improved and simplified results for pigment characterization and sample properties. Embodiments provide for an efficient method to determine the pigmentation (or an acceptable offset) that reduces the number of database "hits" needed to match samples in a laboratory or field application. Further, embodiments include methods to improve searching a database with the possibility to adjust to a better match such that a user is provided with the best match possible and experiences reduced time and cost. Embodiments provide a solution that can quickly identify special effect pigments and generalize the ratios of those pigments, thus enabling faster and better color matching while providing a color match that may be of higher quality.

Figure 1:
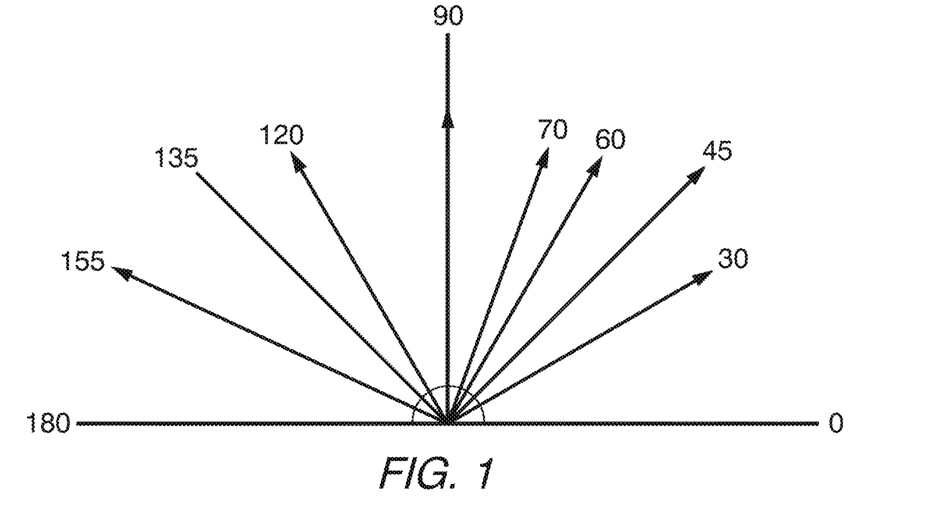
FIG. 1 illustrates angles labeled according to standard mathematical terminology.
Figure 2:
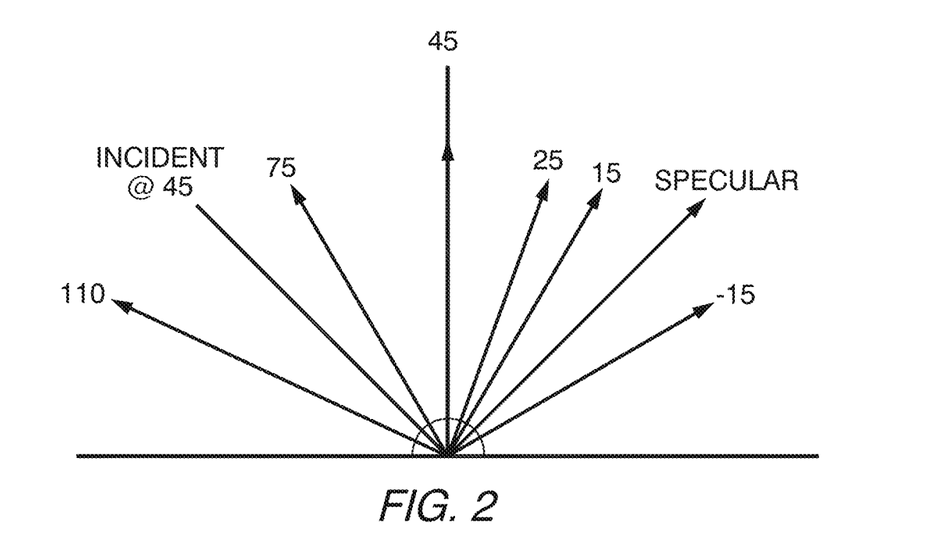
FIG. 2 illustrates the angles of FIG. 1 labeled according to standard multi-angle spectrophotometer terminology.
Figure 3:
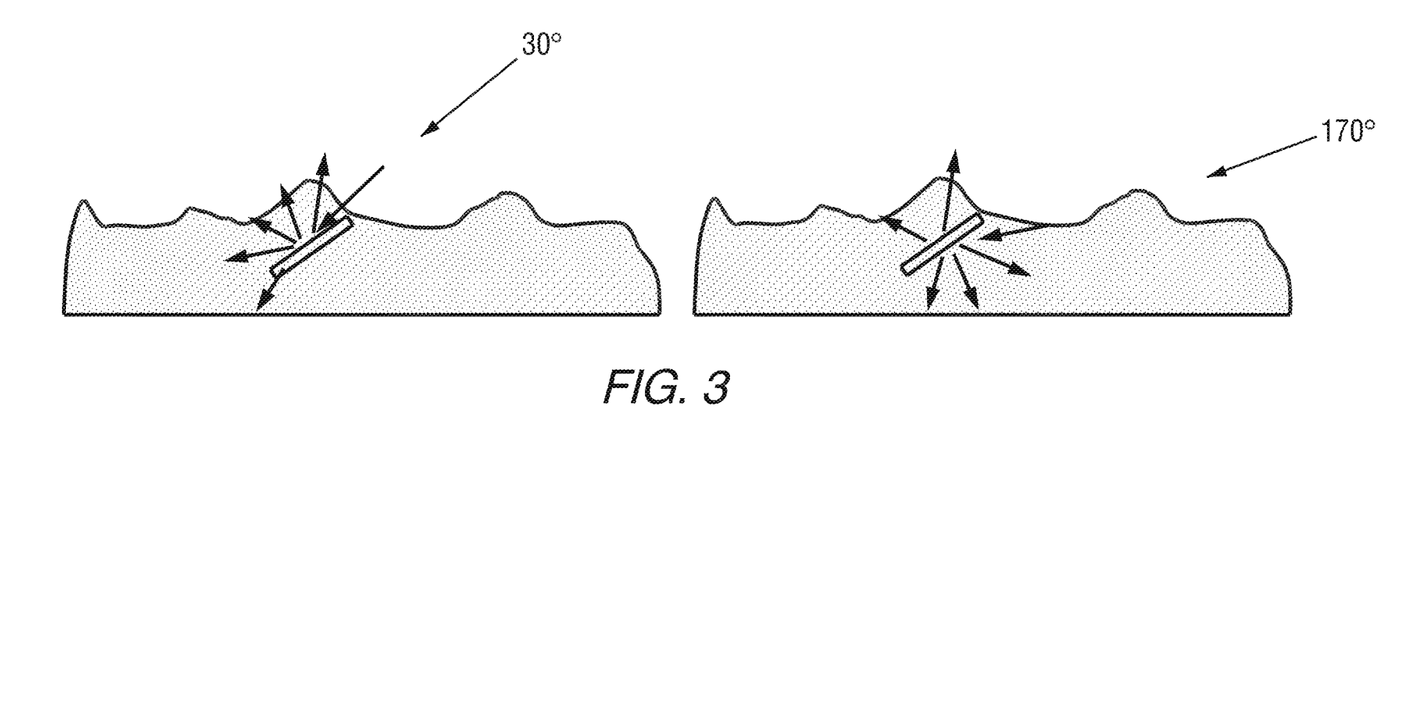
FIG. 3 illustrates angles with respect to a painted sample and light interaction with an effect flake.

Traditional spectrophotometers and visual viewing conditions consider the angles and light sources represented in FIGS. 1 and 2. Both figures contain the exact same angles, but FIG. 2 uses industry accepted terminology to describe the angles in relation to the specular angle. The traditional mathematical standard is used herein. In various embodiments, traditional light sources that use diffuse or collimated color corrected light may be used and an image capturing device (e.g., a color camera with appropriate resolution) may be used to collect images at one, some, or all of the identified or similar angles.

In various embodiments, the distribution of colored sparkles may be determined within a coating at a multitude of angles. Because micas and xirallics change colors uniquely over various viewing angles and conditions, the appropriate pearl may be selected for a search or formulation algorithm, and a relative ratio as to the amount of each required to match the target coating may be estimated. Also, the sparkle color may be used to assist in selection of, for example, appropriate aluminums and other special effect pigments such as glass flake because the color of such materials does not shift over various angles. Thus, embodiments may be used in determining, for example, ratios of aluminums to pearls in effect coatings.

In various embodiments, a high pass filter may be applied to the target image to determine the brightest spots amongst the various pixels in the image. The resultant data/image may include information on only the bright locations. The high pass filter may convolve a matrix of values with a high value center point and low value edge points with the matrix of intensity information of the image. This isolates high intensity pixels. To further refine the sparkle points, an edge detection method of filtering may be applied in conjunction with the intensity filtering.

Figure 4:
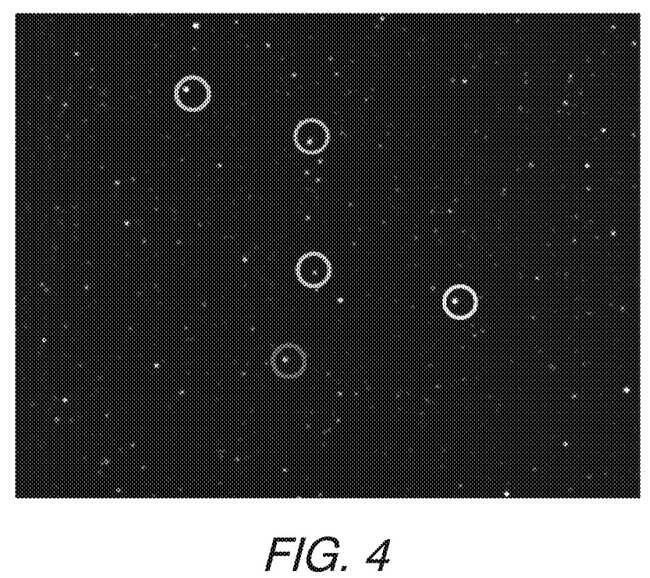
FIG. 4 is an image of a special effect coated panel where a sample set of sparkle colors have been indicated with appropriately colored circles.

In various embodiments individual sparkle points may be labeled and counted, thus isolating/labeling them based upon hue range. FIG. 4 illustrates a simplified selection, limited to five different points for illustrative purposes, of hue based sparkle points and how the points may be identified. For illustrative purposes only, a small selection of sparkle points have been identified by hue, but it can be seen that there are visibly at least one blue, one violet, one green, one red, and one orange sparkle colors that can be labeled. Regional labeling may include a counter for each label segment. Embodiments of the regional labeling methods described herein may include moving from pixel to pixel from left to right, top to bottom of the image, finding pixels that have not yet been labeled that match a specific quality, and labeling nearby pixels that have met the same criteria up to a certain number of movements from the first labeled pixel. A second pass of regional labeling may be used to connect regions adjoining regions that meet the same criteria. Such two-fold regional labeling may be implemented through multiple passes, one each for the assigned hue ranges, or as one pass with checks for specific hue range values.

The techniques described herein may result in a count of labeled sparkle points, each meeting criteria based upon the individual hue criteria, which can then be formatted and output as desired.

Embodiments may include the use of a series of hue-based band pass filters that identify individual hue regions independent of lightness and/or brightness. Regional labeling and analysis of chroma and lightness (and/or brightness) of the regions may be used to isolate individual sparkle points within each hue band. Such a technique may determine sparkle points while estimating the percentage of the image that falls within each hue to enable a relatively quick analysis of color change in sparkle color over multiple images to supplement any further identification. In various embodiments, a band stop filter may be used in place of or in combination with a band pass filter.

In various embodiments, the image data is used to create a matrix of the same size with two to three indices in its third dimension. The pixel image data may only contain RGB values. In such a case, it may be necessary to determine information on intensity (for ease of manipulation), hue, and labeling in the matrix. Also, in various embodiments utilization of images at multiple angles may be convolved with a filter and the differences may be mapped between two (and labeled/counted) to identify aluminum, micas, and special effects as the intensities and/or colors change between the angles.

Similar sparkle points themselves, based on hue with or without chromaticity, may each be averaged into a single color point; thus effectively providing a distribution of sparkle colors for the measured area (i.e., five blue sparkles, five red sparkles, resulting in 50% blue sparkles and 50% red sparkles of all of the sparkles counted for the given area). The distribution may be used to determine the relative amount of a given toner within the complex coating (i.e., a fractional amount correlated to the overall effect contribution). The sparkle color may further be compared back to a database of sparkle color for, for example, masstones and/or binary mixtures of paint system toners/pigments. The comparison may be used to select the most similar toners available in a given paint system to be used for effect matching. Also, the toner selection pool and relative amount of each toner may be used to feed a formulation or search engine. In various embodiments, the information may be placed into decision points for a Bayesian system to produce particle identification, formulation, match searching, and/or adjusting.

It can be understood that embodiments of the invention may be used in conjunction with other texture parameters (e.g., intensity) and/or reflectance data.

In various embodiments, in order to properly identify the type of toners, or an offset thereof, used in an unknown or target sample, it is desirable to observe the correct angles and compare back to existing known toners in a database that has been previously created. Binary mixtures of toners may be generated to evaluate the impact of various concentrations of the toners on their sparkle color attribute.

Figure 5:
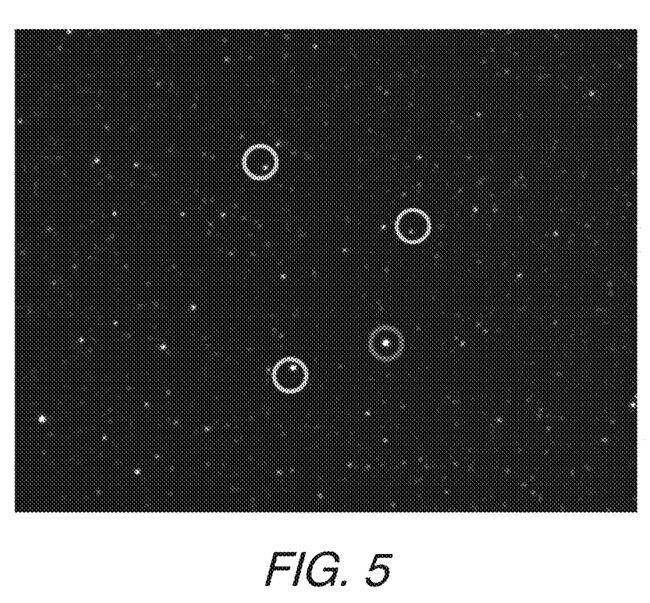
FIG. 5 is an image of the special effect coated panel of FIG. 4 at a different angle of observation.

Each hue within the distribution of the sparkle color to the database of toners may be compared at each selected angle. For example, all toners having a specific red hue at a given angle may be compared to the unknown sample. Evaluation of the sparkle color over the range of the angles selected may be compared between the unknown and the toners. The toners within the database displaying the most similar sparkle color over all evaluated angles are those which are best utilized to match the unknown sample. An example of the differences which may be identified via using various embodiments is shown in comparison of FIGS. 4 and 5. The circled points in the two images reveal that the sparkle spots change in both hue and intensity at different angles. In various embodiments, this situation becomes more complex with a combination of pearl and aluminum toners only to the extent that the ratio of sparkles that it may be desirable to manage change color over the range of angles. For example, an unknown sample may have 50% silver sparkles and 50% green sparkles at a given angle and 100% silver sparkles and 0% green sparkles at another angle. This is indicative of aluminum and green pearl toners present within a coating, where the pearl contribution to the sparkle color was minimized at one angle due to the unique properties of the pearl. This information may provide a target ratio of the mixture (i.e., a 50/50 blend of the total sparkle contribution at one angle).

Figure 6:
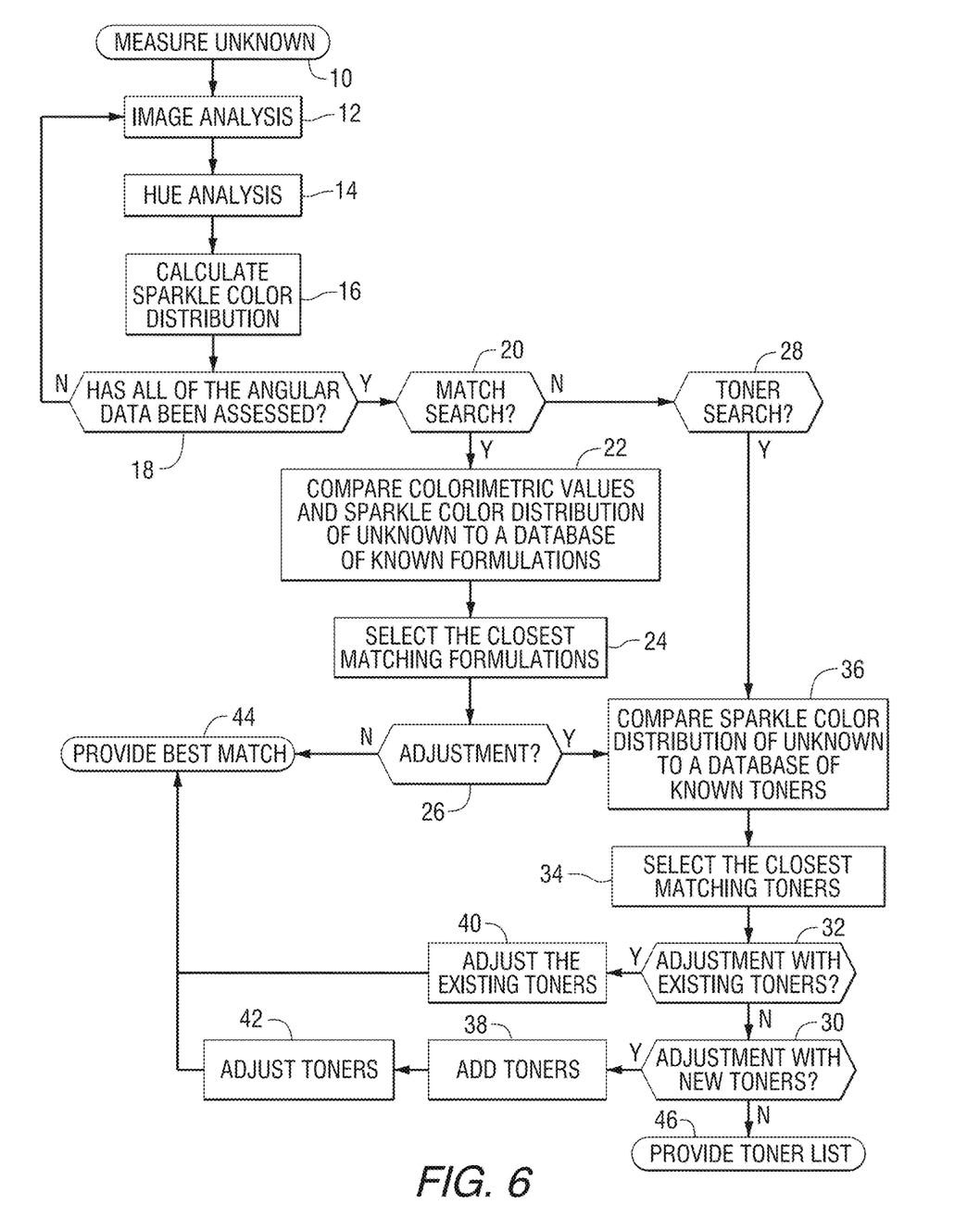
FIG. 6 illustrates an embodiment of a process that calculates a formula for a target complex coating.

FIG. 6 illustrates an embodiment of a process that calculates a formula for a target complex coating. Embodiments of the present invention may be used to search a database where the sparkle color attribute of each sample within the database is known. As illustrated in FIG. 6, after measuring the unknown with, for example, a measurement device such as a color camera enhanced spectrophotometer at step 10, image analysis, as described hereinabove, may be used to determine the sparkle points of a selected angular image at step 12. Once the sparkle points have been determined, a hue analysis may be used at step 14 to determine sparkle color which, in turn, may be used to average similar sparkle points, as described hereinabove, to produce a sparkle color distribution at step 16. A search against a database of complex mixtures may be performed at step 20 to result in the determination of the best special effect match within the database. This can be accomplished by comparing the sparkle color distribution at each angle (e.g., 18) evaluated between the unknown and the database at step 22. The database match having the closest alignment to the unknown at all evaluated (e.g., 18) angles is the best match within the database at step 24. In various embodiments, the importance of an angle or set of angles may be weighted to skew the results returned from the search to adjust for market preference.

Once the best match is found within a database, an adjustment to the match may be made if desired as indicated at step 26. In various embodiments, an adjustment may be made with addition of identified toners (steps 28 and 30) or an adjustment based solely using the toners within the selected match (step 32). An adjustment based solely using the toners within the selected match in various embodiments requires the additional step of having identified toners within the unknown sample and comparing them to the existing list of toners within the best identified match. The best identified matching toners can be determined at step 34 in a similar fashion to the previously described searching of the database for a best match, but the comparison may differ in requiring the inspection of a toner database rather than a database of preformulated matches at step 36. Some or all of the toners which are not already included in the best match may be considered for addition to the formulation during an adjustment at step 38. Whether or not step 38 is performed, the ratios of the toners may be adjusted to most closely align with the actual sparkle color attribute at each angle at steps 40 and 42. In various embodiments, the adjustment may be accomplished by understanding the color sparkle values of each toner at various reduction levels based upon masstones and mixtures within the database. A correlation can be derived (e.g., linear, polynomial, etc.) for each toner within the database which indicates the contribution to sparkle color distribution based on concentration. The correlation may then be used to adjust the amount of individual toners to best match the sparkle color distribution within the unknown at all considered angles. Once either the match or toner search is completed the best matching options 44, 46 may be returned to the user performing the search.

In various embodiments specific sparkles may be "mapped" at various angles so that the sparkle color of a given sparkle may be traced throughout each angle considered. In such an embodiment a more specific identification of a toner may be made because the exact changes (or lack thereof) at each angle may be identified and compared to a database of known toners. Such embodiments may eliminate the potential for a misinterpretation of the characteristics of each sparkle at a given angle compared to a "bulk" distribution assessment method where an individual sparkle may be assumed to change color from green to violet, when in fact the individual sparkle does not make this change between angles. However, the end result of the search, adjustment, and/or formulation will not change significantly by mapping individual sparkle colors because if the overall distribution of the sparkle color is met at each angle the match to the unknown will be acceptable.

Embodiments may include the simplification of the problem to match an unknown first by identification of the bulk toners, such as "mica," "aluminum," or "xirallic." This may be beneficial to simplify an identification and/or search by limiting it to a smaller selection from the database for comparison. In various embodiments it is not necessary to identify the exact toner used in the coating, but rather a suitable selection of toners is satisfactory to address the color and texture issues. Once the toner type has been generally determined, the toners may be more specifically characterized and compared to a database for selection from a plurality of toners.

Figure 7:
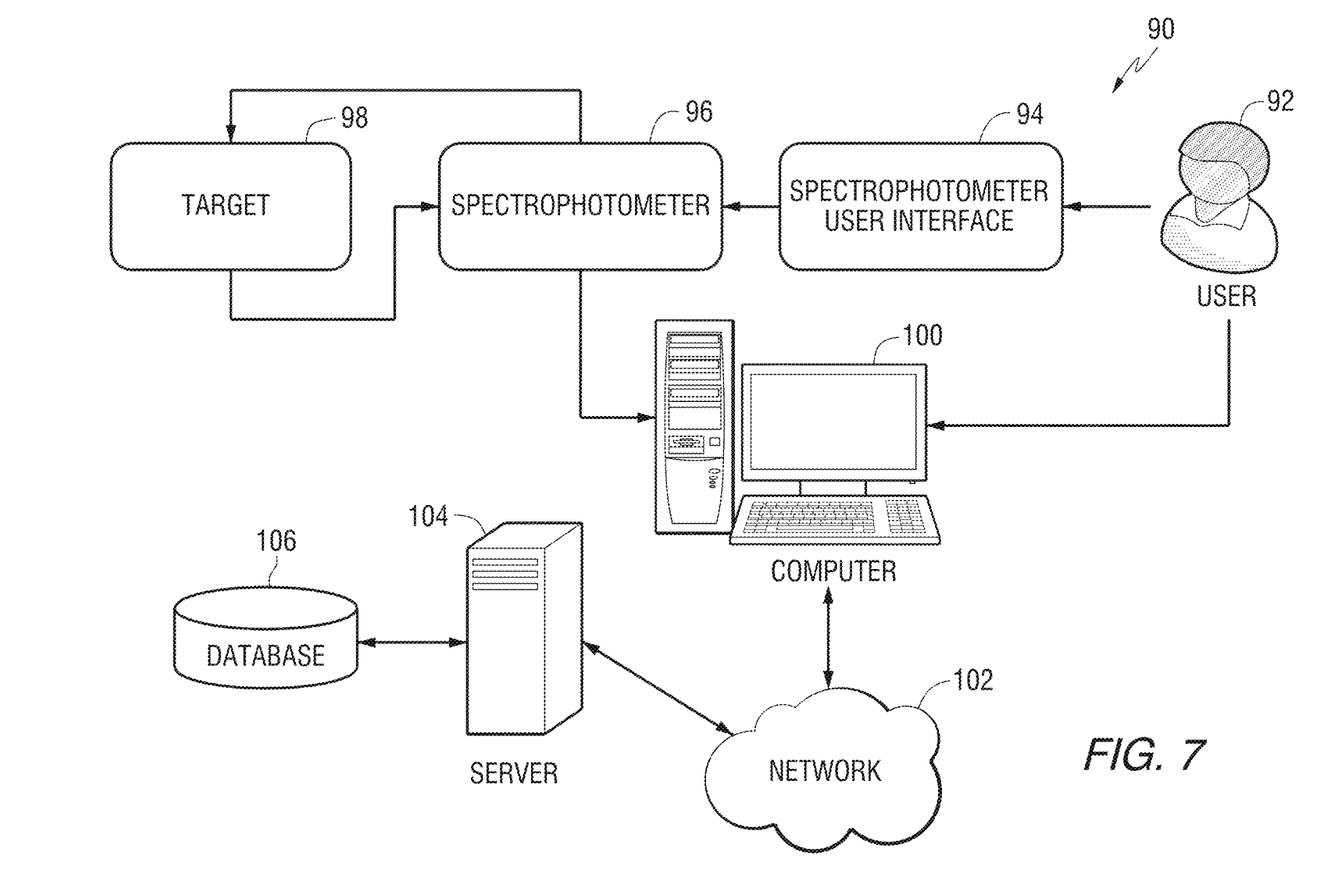
FIG. 7 illustrates an embodiment of a system in which the processes of embodiments of the present invention may be used.

FIG. 7 illustrates an embodiment of a system 90 which may be used to identify physical property attributes of a coating mixture of a target sample. A user 92 may utilize a user interface 94, such as a graphical user interface, to operate a spectrophotometer and/or a camera 96 to measure the properties of a target sample 98. The data from the spectrophotometer and/or a camera 96 may be transferred to a computer 100, such as a personal computer, a mobile device, or any type of processor. The computer 100 may be in communication, via a network 102, with a server 104. The network 102 may be any type of network, such as the Internet, a local area network, an intranet, or a wireless network. The server 104 is in communication with a database 106 that may store the data and information that is used by the methods of embodiments of the present invention for comparison purposes. In various embodiments the database 106 may be utilized in, for example, a client server environment or in, for example, a web based environment such as a cloud computing environment. Various steps of the methods of embodiments of the present invention may be performed by the computer 100 and/or the server 106.

In another aspect, the invention may be implemented as a non-transitory computer readable medium containing software for causing a computer or computer system to perform the method described above. The software can include various modules that are used to enable a processor and a user interface to perform the methods described herein.

It will be readily appreciated by those skilled in the art that modifications may be made to the invention without departing from the concepts disclosed in the forgoing description. Accordingly, the particular embodiments described in detail herein are illustrative only and are not limiting to the scope of the invention.

What is claimed is:

1. A computer implemented method, comprising:
obtaining, using an image capturing device, multiple images each obtained at a different angle with respect to a surface of a target coating;
performing, using an electronic computer processor in operative association with at least one filtering technique, an image analysis on the obtained images to determine at least one sparkle point within the images;
performing, using the processor, a color attribute analysis to determine at least one color attribute associated with the determined sparkle point;
calculating, using the processor, a sparkle color distribution in response to performing the color attribute analysis; and
generating, using the processor and in association with the calculated sparkle color distribution, a coating formulation that is the same or substantially similar in appearance to the target coating.

2. The method of claim 1, wherein at least one color attribute comprises an intensity of a color.

3. The method of claim 1, wherein at least one color attribute comprises at least one of color value, hue, chroma, lightness, brightness, texture, or a combination thereof.

4. The method of claim 1, further comprising mapping at least one difference between multiple selected images at different angles in response to a change in at least one color attribute associated with at least one sparkle point.

5. The method of claim 1, further comprising deriving a correlation for at least one toner wherein the correlation indicates a contribution of the toner to the sparkle color distribution.

6. The method of claim 5, further comprising using the derived correlation at multiple angles to match at least one toner to the sparkle color distribution.

7. The method of claim 1, wherein generating the coating formulation comprises generating a list of toners.

8. The method of claim 1, wherein generating the coating formulation comprises comparing at least one aspect of the sparkle color distribution to a plurality of known coating formulations.

9. A system comprising:
a database; and
a processor programmed for communication with the database, the processor programmed for:
obtaining multiple images each at a different angle with respect to a surface of a target coating,
performing, in operative association with at least one filtering technique, an image analysis on the obtained images to determine at least one sparkle point within the images,
performing, using the processor, a color attribute analysis to determine at least one color attribute associated with the determined sparkle point;
calculating, using the processor, a sparkle color distribution in response to performing the color attribute analysis; and
generating, using the processor and in association with the calculated sparkle color distribution, a coating formulation that is the same or substantially similar in appearance to the target coating.

10. The system of claim 9, wherein at least one color attribute comprises an intensity of a color.

11. The system of claim 9, wherein at least one color attribute comprises at least one of color value, hue, chroma, lightness, brightness, texture, or a combination thereof.

12. The system of claim 9, further comprising the processor programmed for mapping at least one difference between multiple selected images at different angles in response to a change in at least one color attribute.

13. The system of claim 9, further comprising the processor programmed for deriving a correlation for at least one toner wherein the correlation indicates a contribution of the toner to the sparkle color distribution.

14. The system of claim 13, further comprising the processor programmed for using the derived correlation at multiple angles to match at least one toner to at least a portion of the sparkle color distribution.

15. The system of claim 9, wherein generating the coating formulation comprises generating a list of toners.

16. The system of claim 9, wherein generating the coating formulation comprises comparing at least a portion of the sparkle color distribution to a plurality of known coating formulations.

17. A non-transitory computer readable medium comprising software for causing a processor to:
obtain multiple images each at a different angle with respect to a surface of a target coating;
perform, in operative association with at least one filtering technique, an image analysis on the obtained images to determine at least one sparkle point within the images;

perform a color attribute analysis to determine at least one color attribute associated with the determined sparkle point;

calculate a sparkle color distribution in response to performing the color attribute analysis; and generate, in association with the calculated sparkle color distribution, a coating formulation that is the same or substantially similar in appearance to the target coating.

18. The computer readable medium of claim 17, wherein at least one color attribute comprises an intensity of a color.

19. The computer readable medium of claim 17, wherein at least one color attribute comprises at least one of color value, hue, chroma, lightness, brightness, texture, or a combination thereof.

20. The computer readable medium of claim 17, further comprising mapping at least one difference between multiple selected images at different angles in response to a change in at least one color attribute associated with at least one sparkle point.

21. The computer readable medium of claim 17, wherein generating the coating formulation comprises generating a list of toners.

22. The computer readable medium of claim 17, wherein generating the coating formulation comprises comparing at least one aspect of the sparkle color distribution to a plurality of known coating formulations.

23. The computer readable medium of claim 22, further comprising:

matching a first sparkle point with a first color value at a first angle in a target coating with a sparkle point with the first color value at the first angle taken from a known coating formulation; and matching a second sparkle point with a second color value at a second angle in the target coating with a sparkle point with the second color value at the second angle taken from the known coating formulation;

wherein the first color value is different from the second color value.

24. The computer readable medium of claim 22, further comprising:

averaging multiple sparkle point color values taken at each of the first and second angles to create an averaged sparkle color value at the first and second angles; and comparing the averaged sparkle point color values with color values of the first and second angles in the known coating formulation.

25. The computer readable medium of claim 17, further comprising deriving a correlation for at least one toner wherein the correlation indicates a contribution of the toner to the sparkle color distribution.

26. The computer readable medium of claim 25, further comprising using the derived correlation at multiple angles to match at least one toner to the sparkle color distribution.

27. The computer readable medium of claim 25, further comprising:

using the derived correlation at multiple angles to determine a ratio of individual toners in the target coating;

wherein each toner ratio is directly attributable to sparkle color distribution in the target coating.

28. The computer readable medium of claim 17, wherein the filtering technique further comprises:

identifying an individual hue region in the target coating using one of a band pass filter, a band stop filter, or a high pass filter;

wherein the individual hue region is independent of a lightness or a brightness value.

29. The computer readable medium of claim 28, further comprising a plurality of the band pass filter, band stop filter, and high pass filter to identify all hue regions in the target coating.

* * * * *